(12) United States Patent
Nishioka et al.

(10) Patent No.: US 7,961,563 B2
(45) Date of Patent: Jun. 14, 2011

(54) MEDIA PROCESSOR AND CONTROL METHOD OF MEDIA PROCESSOR

(75) Inventors: Atsushi Nishioka, Shiojiri (JP); Kenichiro Arai, Shiojiri (JP); Hidetoshi Maeshima, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 790 days.

(21) Appl. No.: 11/914,459

(22) PCT Filed: May 25, 2006

(86) PCT No.: PCT/JP2006/310479
§ 371 (c)(1),
(2), (4) Date: Nov. 15, 2007

(87) PCT Pub. No.: WO2006/132094
PCT Pub. Date: Dec. 14, 2006

(65) Prior Publication Data
US 2009/0028010 A1   Jan. 29, 2009

(30) Foreign Application Priority Data
Jun. 10, 2005   (JP) ................ P2005-170458

(51) Int. Cl.
*G11B 21/08* (2006.01)
(52) U.S. Cl. .................................. 369/30.32
(58) Field of Classification Search .................. None
See application file for complete search history.

(56) References Cited

U.S. PATENT DOCUMENTS

| | | | |
|---|---|---|---|
| 5,875,459 A * | 2/1999 | Taoda ........................ | 711/114 |
| 5,914,918 A | 6/1999 | Lee et al. | |
| 6,115,331 A * | 9/2000 | Inoue et al. ................ | 369/30.34 |
| 6,404,707 B1 * | 6/2002 | Kaneda et al. ............. | 369/30.06 |
| 2002/0169521 A1 | 11/2002 | Goodman et al. | |
| 2003/0117932 A1 * | 6/2003 | Morishima et al. ......... | 369/116 |

(Continued)

FOREIGN PATENT DOCUMENTS

EP   0 603 685   6/1994

(Continued)

OTHER PUBLICATIONS

English Machine Translation of Japanese Patent Publication No. 11-232835 published Aug. 27, 1999, 14 pages.

(Continued)

*Primary Examiner* — Daniell L Negrón
*Assistant Examiner* — Henok Heyi
(74) *Attorney, Agent, or Firm* — Nixon & Vanderhye P.C.

(57) ABSTRACT

A media processor such as a CD publisher functions as a media library. The CD publisher takes out media from a media storage unit, sets the media in a media drive, performs writing of data, and stores the media in a writing-completed media storage unit if there is a data writing request and/or an additional data writing request. The publisher takes out the target media from the media storage unit on the basis of details stored in the storage unit and sets the media in the media drive if there is a data reference request and a data output request. Data of the media can be referenced from the outside, and media in which data writing has been completed can be used as a media library. When final additional writing is completed or there is a discharge command of the media, printing of a label related to data written on a label surface of the media is collectively performed, and then the media is discharged.

14 Claims, 11 Drawing Sheets

U.S. PATENT DOCUMENTS

2006/0072405 A1* 4/2006 Pratt .......................... 369/47.5
2006/0152841 A1* 7/2006 Yasue .......................... 360/69

FOREIGN PATENT DOCUMENTS

| | | |
|---|---|---|
| JP | 54-41681 | 12/1979 |
| JP | 11-232835 | 8/1999 |
| JP | 2000-82250 | 3/2000 |
| JP | 2000-222861 | 8/2000 |
| JP | 2001-126369 | 5/2001 |
| JP | 2002-237169 | 8/2002 |
| JP | 2003-257084 | 9/2003 |
| JP | 2004-192735 | 7/2004 |
| JP | 2004-358732 | 12/2004 |
| WO | WO 97/24218 | 7/1997 |
| WO | WO 2005/094173 | 10/2005 |

OTHER PUBLICATIONS

English Machine Translation of Japanese Patent Publication No. 2003-256084 published Sep. 12, 2003, 14 pages.
English Machine Translation of Japanese Patent Publication No. 2003-257084 published Sep. 12, 2003, 14 pages.

* cited by examiner

[PATIENT DATA IN HOSPITAL]

FIRST DAY    WEIGHT TEST
SECOND DAY  BLOOD TEST
THIRD DAY    CT SCAN
FOURTH DAY  BRAIN WAVE TEST
FIFTH DAY    COLON TEST

[DETAILS OF PRINT]

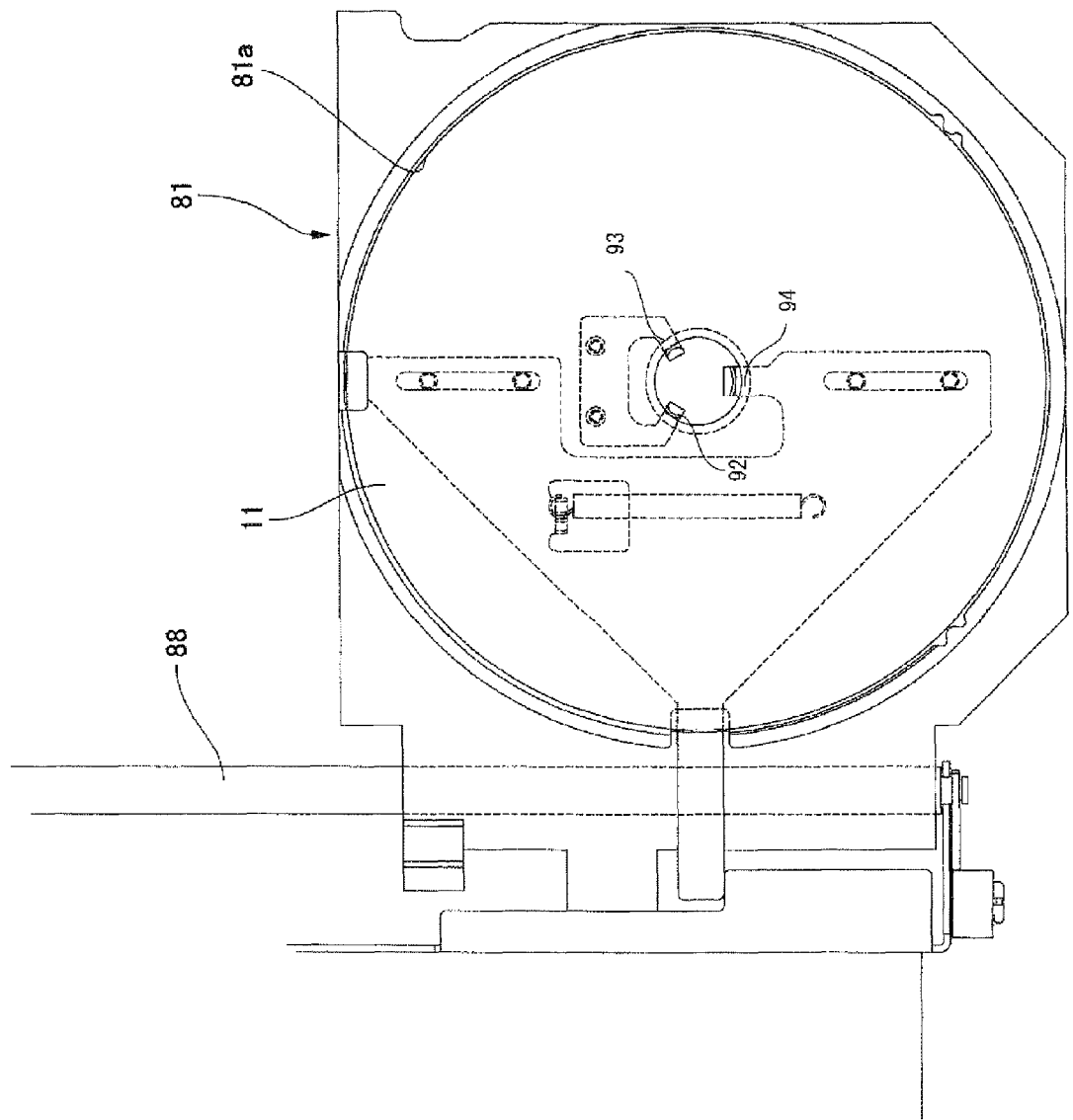

MEDIA PROCESSOR AND CONTROL METHOD OF MEDIA PROCESSOR

This application is the U.S. national phase of International Application No. PCT/JP2006/310479 filed 25 May 2006 which designated the U.S. and claims priority to Japanese Patent Application No. 2005-170458 filed 10 Jun. 2005, the entire contents of each of which are hereby incorporated by reference.

TECHNICAL FIELD

The present invention relates to a media processor, such as a CD/DVD publisher and a duplicator, and in particular, to a media processor having a function as a media library and a control method of a media processor.

BACKGROUND ART

In general, a CD/DVD publisher is configured such that a blank CD or the like stored in a blank media stacker is supplied to a built-in CD drive, predetermined data is written into the blank CD, a label or the like is printed on a CD label surface by a built-in printer, and then the CD is stored in a created media stacker or is published from an outlet. For example, Patent Document 1 discloses such a publisher.

In addition, as a mechanism for printing a label on a surface of media, such as a CD, Patent Document 2 discloses an optical disk recording apparatus configured such that a marking indicating an already printed region is recorded on an optical disk and a label is printed in a blank region of the optical disk on the basis of the marking. In addition, Patent Document 3 discloses an additional printing apparatus configured such that print data on media is read by a printing means and printing is performed on a blank part on the media on the basis of the read print data. Using such an apparatus, a label may be additionally written such that the label does not overlap an already printed region of a media surface.

Patent Document 4 discloses a data creating device that registers program information of multimedia data and component information of a program, as asset information of an optical disk, in the optical disk together with image data such that the program information and the component information are associated with each other and an optical disk library where a registered optical disk is stored. In addition, program information and component information corresponding to a keyword input from the outside are extracted on the basis of the asset information registered in the optical disk, and predetermined multimedia data is transmitted from the optical disk library. Patent Document 5 discloses a method in which location information of contents information, such as video information, is made into a database, and a large amount of contents are recorded and managed by using a fixed type storage device, such as a hard disk, and detachable recording media, such as a DVD-RAM.

Patent Document 1: U.S. Pat. No. 5,914,918

Patent Document 2: Japanese Patent Publication No. 2004-192735A

Patent Document 3: Japanese Patent Publication No. 2004-358732A

Patent Document 4: Japanese Patent Publication No. 2000-222861A

Patent Document 5: Japanese Patent Publication No. 2002-237169A

DISCLOSURE OF THE INVENTION

Problems to be Solved by the Invention

In general, a CD/DVD publisher stores created media in a stacker or performs an operation of publishing the created media from an outlet. It is not possible to refer to data of created media, which are created in a publisher, from the outside or to output the data to the outside in a state where the created media are stored in the publisher without taking out the created media. Furthermore, data cannot also be additionally written into the created media. It may be possible to refer to data and duplicate the data by taking out created media and moving the media to an apparatus having a function, such as a changer. However, handling the created media manually causes a problem in securing the reliability of data, a problem that secret data is leaked out, and the like.

Further, in the case of additionally writing data in the created media, a label such as a title of additionally written data is preferably also additionally written so that it can be recognized which data has been written. In this case, it is necessary to print a label related to additionally written data on a blank part of a printing surface of created media so as not to overlap an already printed label. In order to print the label on the blank part, an identification means for identifying the already printed label or an operation of rotating media so that the identification means can read the already printed label is required. Accordingly, in the case of a known method of additionally writing a label, there is a problem in that an apparatus cost increases.

In view of the above problems, it is an object of the present invention to propose a media processor, such as a CD publisher, capable of referring to data written in created media and performing additional writing of data into the created media without taking out the created media.

Further, it is another object of the present invention to propose a media processor capable of performing printing on a label surface of media without using an identification means or the like for identifying a printed image.

Means for Solving the Problem

The present invention is achieved by the following configurations.

According to a first aspect of the present invention, a media processor includes: a media storage unit that stores media, such as a CD or a DVD; a media drive that performs writing of data into the media and reading of data from the media; a media conveying mechanism that conveys the media; and a control unit that performs a driving control for the media drive and the media conveying mechanism. The control unit executes a media writing control operation in response to a data writing request in which unused blank media is taken out from the media storage unit and data is written in the blank media, the media is returned to the media storage unit as writing-completed media, and identification information, storage location information, and information on written data of the writing-completed media are stored in a predetermined storage place, and executes a data reading control operation in response to a data reference request or a data output request in which the writing-completed media that is targeted is specified with reference to storage information stored in the storage place, the writing-completed media is taken out from the media storage unit and written data is read, and the writing-completed media is returned to the media storage unit.

According to a second aspect of the present invention, in the media processor according to the first aspect of the present invention, the control unit executes an additional data writing control operation in response to an additional data writing request in which the writing-completed media that is targeted is specified with reference to the storage information stored in the storage place, the writing-completed media is taken out from the media storage unit and the data is additionally written, the writing-completed media is returned to the media storage unit, and information on additionally written data is stored in the storage place.

According to a third aspect of the present invention, in the media processor according to the second aspect of the present invention, the storage place is an internal storage unit.

According to a fourth aspect of the present invention, the media processor according to the second aspect of the present invention further includes a label printer that performs printing on a label surface of media written with data. The control unit causes information on the written data and information on the additionally written data to be collectively printed on the media.

According to a fifth aspect of the present invention, in the media processor according to the fourth aspect of the present invention, the control unit executes finalizing processing for prohibiting additional writing of data into the media.

According to a sixth aspect of the present invention, the media processor according to the fourth or fifth aspect of the present invention further includes a media outlet for discharging the media to the outside of the apparatus. The control unit causes media printed with the information on the written data and the information on the additionally written data to be taken out from the media outlet if there is a media discharge request.

According to a seventh aspect of the present invention, in the media processor according to any one of the fourth to sixth aspects of the present invention, the control unit causes the identification information of the media to be printed on a label surface of the writing-completed media and then causes the writing-completed media to be returned to the media storage unit in the media writing control operation.

According to an eighth aspect of the present invention, in the media processor according to any one of the first to seventh aspects of the present invention, the media storage unit includes: a blank media supply unit for storing the blank media in a state where the blank media are stacked in the thickness direction; and a writing-completed media storage unit for storing the writing-completed media in a state where the writing-completed media are stacked in the thickness direction. The media conveying mechanism is configured to sequentially take out the media from the top position of each of the blank media supply unit and the writing-completed media storage unit and sequentially place the media at the top position of each of the blank media supply unit and the writing-completed media storage unit.

According to a ninth aspect of the present invention, in the media processor according to the eighth aspect of the present invention, when the writing-completed media to be taken out does not exist at the top position of the writing-completed media storage unit, the control unit causes writing-completed media stacked on the writing-completed media to be taken out to be temporarily moved to the blank media supply unit and causes the corresponding writing-completed media to then be taken out to be taken out.

According to a tenth aspect of the present invention, a control method of a media processor including a media storage unit that stores media, such as a CD or a DVD, a media drive that performs writing of data into the media and reading of data from the media, and a media conveying mechanism that conveys the media, the control method includes: a writing step of taking out unused blank media from the media storage unit and writing data in the blank media in response to a data writing request; a storage step of returning the media, in which the data is written in the writing step, to the media storage unit as writing-completed media and storing identification information, storage location information, and information on written data of the writing-completed media in a predetermined storage place; and a step of specifying the writing-completed media that is targeted with reference to storage information stored in the storage place, taking out the writing-completed media from the media storage unit and reading written data, and returning the writing-completed media to the media storage unit in response to a data reference request or a data output request.

According to an eleventh aspect of the present invention, in the control method of a media processor according to the tenth aspect of the present invention, a label printer that performs printing on a label surface of the media is caused to print the identification information, and the printed writing-completed media is returned to the media storage unit after execution of the storage step.

According to a twelfth aspect of the present invention, the control method of a media processor according to the tenth or eleventh aspect of the present invention further includes a step of specifying the writing-completed media that is targeted with reference to the storage information stored in the storage place, taking out the writing-completed media from the media storage unit and additionally writing the data, returning the writing-completed media to the media storage unit, and storing information on additionally written data in the storage place in response to an additional data writing request.

According to a thirteenth aspect of the present invention, in the control method of a media processor according to the twelfth aspect of the present invention, information on the written data and information on the additionally written data are collectively printed by a label printer that performs printing on a label surface of media after final additional writing of data is performed on the media.

According to a fourteenth aspect of the present invention, the control method of a media processor according to the tenth or eleventh aspect of the present invention further includes a step of causing a label printer that performs printing on a label surface of the media to collectively print information on the written data and information on the additionally written data and then discharging the media from a media outlet if there is a media discharge request.

According to a fifteenth aspect of the present invention, in the control method of a media processor according to the thirteenth or fourteenth aspect of the present invention, finalizing processing for prohibiting additional writing of data into the media is executed before printing on the label surface of the media or after the printing.

Effects of the Invention

According to the media processor and the control method of a media processor of the present invention, if there is a data reference request from the outside, it is possible to take out writing-completed media which is targeted on the basis of information stored in a predetermined storage place, in which information on storage location and written data of the writing-completed media stored in the media storage unit is stored and to set the writing-completed media in a built-in media drive, such that it is possible to refer to the data or output the data. Accordingly, the writing-completed media, which is created and stored inside the media processor, can be used as a media library. As a result, since creating media for construction of a media library can be performed by a single apparatus without taking out the media and without manual assistance, it is possible to secure the reliability of data and the data confidentiality.

In addition, according to the media processor and the control method of a media processor of the present invention, it is possible to write additional data in writing-completed media stored in the media storage unit. Accordingly, the media processor and the control method of a media processor of the present invention is advantageous in that, for example, a sheet of media is assigned to one client in a hospital, an accounting office, and the like, and information of each client can be managed in a relationship where media and a client correspond to each other in a one-to-one manner.

According to the media processor of the present invention, an internal storage unit of the media processor may be used as the storage place. It is needless to say that an external storage device may also be used as the storage place.

In addition, for example, in the case of taking out media, it is preferable to print a label on a label surface of the media so that details of the written data can be recognized. For this reason, according to the media processor and the control method of a media processor of the present invention, there is provided a label printer for printing information on written data and information on additionally written data on the label surface of the media written with data.

In addition, in the case of printing a label whenever writing of data is performed, a control operation and a sensor for recognizing an already printed part of the label surface of the media are needed such that additional printing is performed without overlapping the already printed part. In order to make such sensor and control operation unnecessary, the media processor and the control method of a media processor of the present invention are characterized in that printing of information on written data and information on additionally written data is collectively performed after final additional writing of data into the media has been performed.

In general, there is no need to print a label on the media until the media is taken out. By collectively performing label printing at the time of media ejection when the label printing is needed, for example, a sensor for recognizing an already printed part, which is needed in the case of additionally printing the label, is not required. As a result, the apparatus can be constructed at a low price.

Moreover, the media processor and the control method of a media processor of the present invention are characterized in that the finalizing processing is executed after the final additional writing of data such that data cannot be additionally written into the media. Thus, it is possible to secure the reliability of data of created media published from the media processor.

Here, printing of the information on written data and the information on additionally written data may be performed at the time of discharging the media. Even in this case, it is preferable to execute the finalizing processing before printing or after printing such that additional writing cannot be performed on the media.

Furthermore, the media processor and the control method of a media processor of the present invention are characterized in that identification information of the media is printed on the label surface of the writing-completed media and then the media is returned to the media storage unit. If the identification information for identifying media is printed on the media, it is possible to identify each media by visual observation at the time of a malfunction or during maintenance, which is convenient.

Furthermore, according to the media processor of the present invention, the media storage unit includes a blank media supply unit for storing blank media in a state where the blank media are stacked in the thickness direction and a writing-completed media storage unit for storing the writing-completed media in a state where the writing-completed media are stacked in the thickness direction. As a result, blank media and writing-completed media can be stored so as to be clearly distinguished from each other. In addition, the media conveying mechanism is characterized in that the media conveying mechanism can sequentially take out the media from the top position of each of the blank media supply unit and the writing-completed media storage unit and can sequentially place the media at the top position of each of the blank media supply unit and the writing-completed media storage unit.

In addition, according to the media processor of the present invention, when the writing-completed media to be taken out does not exist at the top position in the writing-completed media storage unit, the writing-completed media stacked on the writing-completed media to be taken out are temporarily stored in the blank media supply unit. Accordingly, even if the media to be taken out is located at any layer of the writing-completed media storage unit, the media can be reliably taken out.

BRIEF DESCRIPTION OF THE DRAWINGS

FIG. 11 is a plan view illustrating a media tray of a printer shown in FIG. 9.

DESCRIPTION OF REFERENCE NUMERALS AND SIGNS

Figure 1:
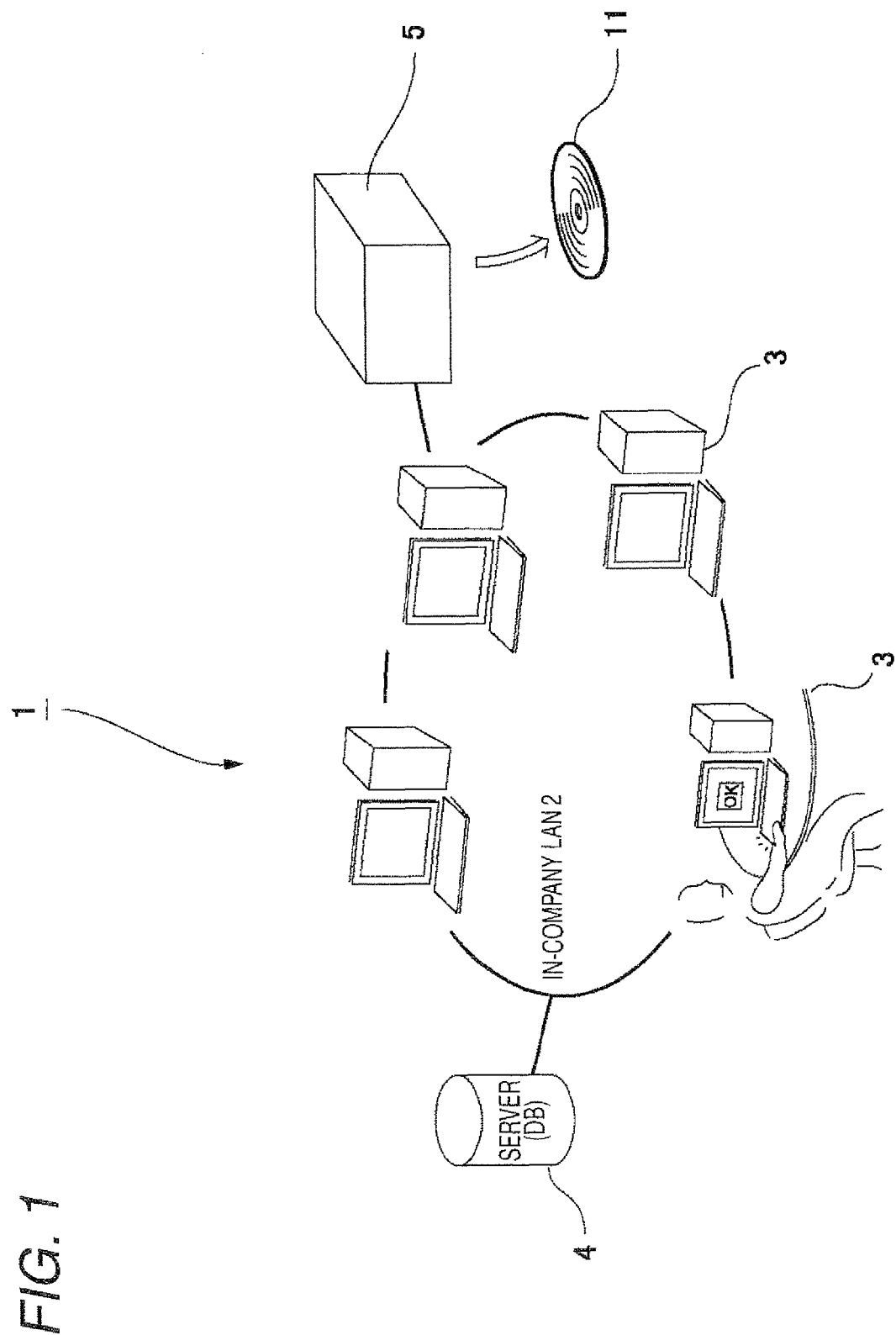
FIG. 1 is a view schematically illustrating the configuration of a client management system to which the present invention is applied.

1: data management system
2: in-company LAN
3: client PC
4: management server
5: CD publisher
11, 11A, 11B: media
11a: label printing surface
12: media storage unit
13: media drive
14: label printer
15: media conveying mechanism
16: control unit 17: storage unit
18: blank media supply unit
19: writing-completed media storage unit
20: media outlet

BEST MODE FOR CARRYING OUT THE INVENTION

Hereinafter, an embodiment of the present invention will be described with reference to the accompanying drawings. FIG. 1 is a view schematically illustrating the configuration of a client management system including a CD publisher to which the present invention is applied. For example, the client management system may be used as a client management system in a hospital, an accounting office, and the like.

A client management system 1 includes an in-company LAN 2, a plurality of client PCs 3 connected to the in-company LAN 2, a management server 4 that manages the in-company LAN 2, and a CD publisher 5 (media processor) connected to the in-company LAN 2. The CD publisher 5 in this example also functions as a media library.

Basically, each of the plurality of client PCs 3 has the same configuration as a PC that is commonly used, and an input device and a display device are connected to each client PC 3. Client data input or created in each client PC 3 is supplied to the management server 4 through the in-company LAN 2, such that the client data is managed in a unified manner by the management server 4.

The management server 4 manages the in-company LAN 2 and has a function of restricting access from each client PC 3. In addition, the management server 4 includes a database DB managed in a unified manner. Data created in each client PC 3 is stored in the database DB in a state where an access restriction corresponding to a predetermined level is granted. CD publication history information is accumulated in the database DB. The CD publication history information includes an ID of published media (CD), information for specifying data written into the CD, date of publication, a user ID that requested the publication, and the like.

Figure 2:
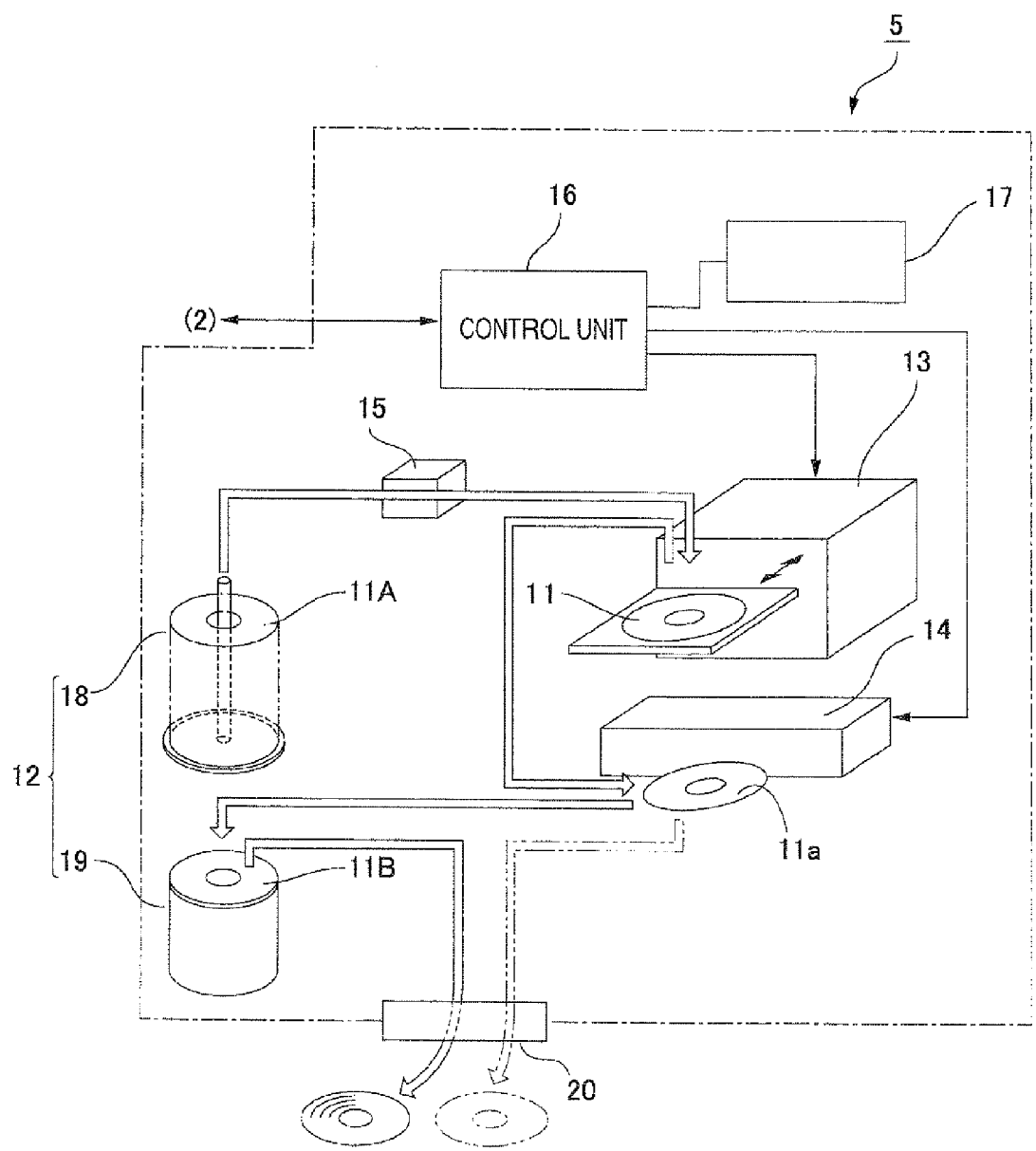
FIG. 2 is a view schematically illustrating the configuration of a CD publisher shown in FIG. 1.

FIG. 2 is a view schematically illustrating the configuration of the CD publisher 5. The CD publisher 5 includes a media storage unit 12 for storing media 11 (blank media 11A and writing-completed media 11B) such as a CD or a DVD, a media drive 13 that performs writing of data into the media 11 and reading of data from the media 11, a label printer 14 for printing a label, for example, a title indicating written data (information on written data and information on additionally written data) on a label surface 11a of the media 11 in which the data is written, a media conveying mechanism 15 for conveying the media 11, and a control unit 16 that performs a driving control for each part. The control unit 16 is connected to the in-company LAN 2. In addition, the control unit 16 is connected with a storage unit 17 that stores information on an ID, a storage location, and written data of the writing-completed media 11B which are stored in the media storage unit 12 and in which data is written.

The media storage unit 12 includes a blank media supply unit 18, in which the blank media 11A is stored in a state where the blank media 11A are stacked in the thickness direction, and a writing-completed media storage unit 19 for storing the writing-completed media 11B in a state where the writing-completed media 11B are stacked similarly in the thickness direction of the writing-completed media storage unit 19. The media conveying mechanism 15 may sequentially take out the media 11 from the top position of each of the blank media supply unit 18 and the writing-completed media storage unit 19 and may sequentially place the media 11 at the top position of each of the blank media supply unit 18 and the writing-completed media storage unit 19.

If a data writing request is received from the client PC 3 or the like through the LAN 2, the control unit 16 in this example executes a media writing operation control in which the blank media 11A is taken out from the blank media supply unit 18 of the media storage unit 12, and data is written in the blank media 11A, the writing-completed media 11B is returned to the writing-completed media storage unit 19 of the media 11, and information on an ID, a storage location, and written data of the writing-completed media 11B are stored in the storage unit 17.

In addition, if an additional data writing request is received, the control unit 16 executes an additional data writing operation control in which it is specified with reference to the information stored in the storage unit 17 at which position in the writing-completed media storage unit 19 of the media storage unit 12 the writing-completed media 11B targeted exists, the writing-completed media 11B targeted is taken out, and data is additionally written, and the writing-completed media 11B is returned to the same place. In this case, information on additionally written data is stored in the storage unit 17.

In addition, if a data reference request or data output request is received, the control unit 16 executes a data reading operation control in which it is specified with reference to the information stored in the storage unit 17 at which position in the writing-completed media storage unit 19 of the media storage unit 12 the writing-completed media 11B recorded with target data exists, the writing-completed media 11B is taken out to read target data, and the writing-completed media 11B is returned to the same place.

Here, when the writing-completed media 11B to be taken out does not exist at the top position of the writing-completed media storage unit 19, the control unit 16 executes a media ejection operation control in which the writing-completed media 11B stacked on the writing-completed media 11B to be taken out are temporarily moved to the blank media supply unit 18 and then the corresponding writing-completed media 11B to be taken out is taken out.

Next, label printing of the label printer 14 onto the label surface 11a of the media 11B is performed as follows under the control of the control unit 16. First, the label printing on each media 11B is collectively performed after final additional writing of data with respect to the corresponding media 11B is performed. For this reason, label printing information, such as a title, is also stored as information on written data in the storage unit 17. In addition, if a media discharge request (publication request) is received, a label on the written data until then is collectively printed by the printer 14 and then the corresponding media 11B is discharged (published) from a media outlet 20 if label printing of the target media 11B is not performed.

(Explanation on an Operation of a CD Publisher)

Figure 3:
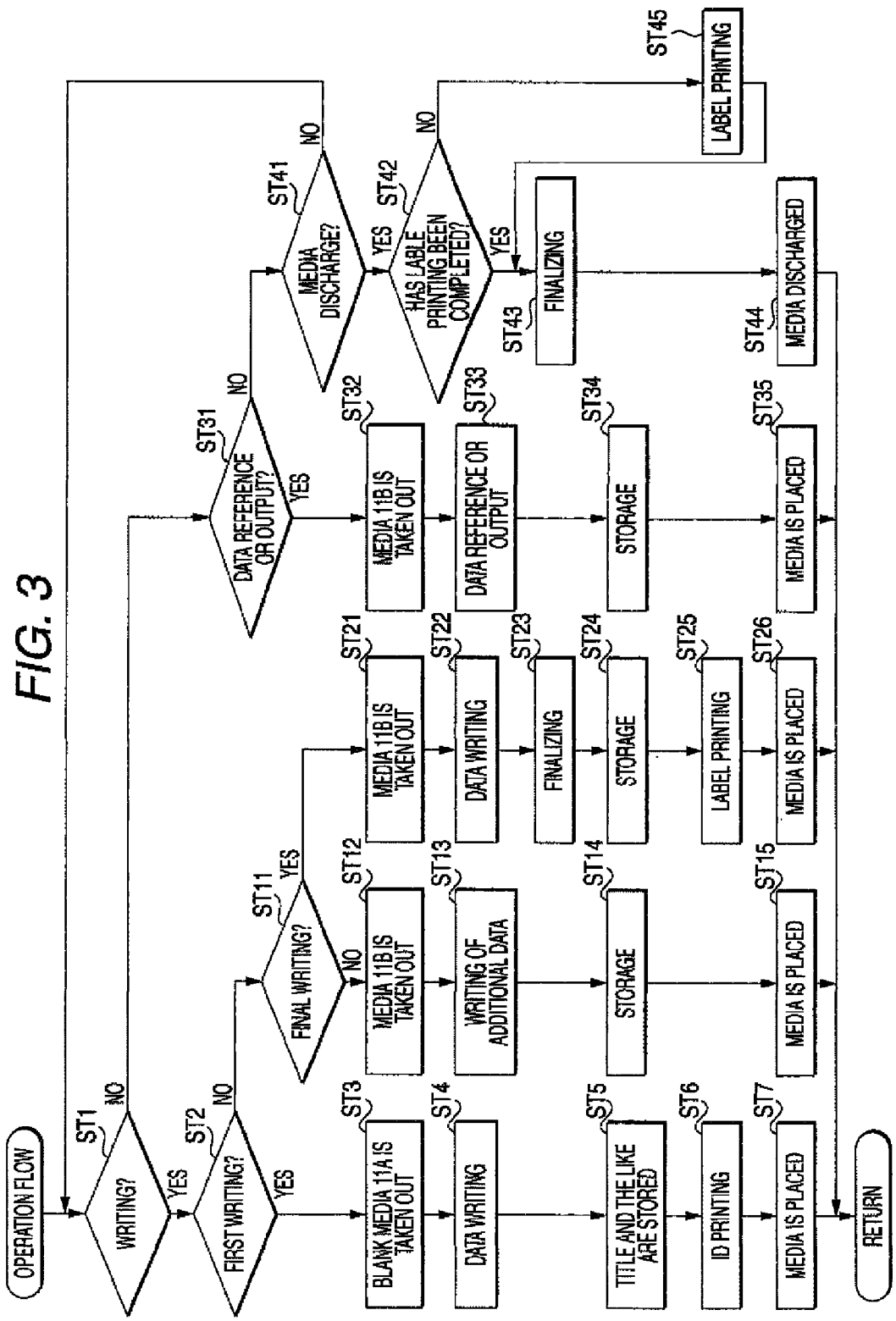
FIG. 3 is a flow chart schematically illustrating an operation of the CD publisher shown in FIG. 1.

FIG. 3 is a flow chart schematically illustrating an operation of the CD publisher 5. Hereinafter, an operation of the CD publisher 5 will be described with reference to the flow chart. First, when a data writing command is received from the client PC 3, the management server 4, and the like through the LAN 2 (step ST1), attribute information of written data supplied together with the command is checked, and it is determined whether the command is a command of writing into the blank media 11A (that is, whether or not the writing is first writing) or the command is a command of additional writing of data into the writing-completed media 11B (step ST2).

In the event of the command of writing into the blank media 11A, the blank media 11A positioned at the top of the blank media supply unit 18 of the media storage unit 12 is taken out by the media conveying mechanism 15 (step ST3), and the writing-completed media 11B is created by setting the blank media 11A in the media drive 13 and performing writing of data and an ID for specifying corresponding media (step ST4). In addition, the ID, a name of the written data, a data structure, and the like of the writing-completed media 11B are stored in the storage unit 17 wherein the ID, the name of the written data, the data structure, and the like correspond to the writing-completed media 11B (step ST5). Thereafter, the writing-completed media 11B is set in the label printer 14 and then the ID is printed on a corner of an outer periphery or an inner periphery of the label surface 11a (step ST6) Then, the writing-completed medial 11B is received in the writing-completed media storage unit 19 of the media storage unit 12, and information on the storage location is stored in the storage unit 17 wherein the storage location corresponds to the ID of the writing-completed media 11B (step ST7).

Then, when the data writing command is an additional data writing command, it is determined on the basis of attribute information whether or not additionally written data is final data (step ST11). In the case when the additionally written data is not final additional data, the location where the writing-completed media 11B is placed is checked on the basis of the attribute information of the additionally written data, the writing-completed media 11B on which writing is to be performed is taken out from the writing-completed media storage unit 19 by the media conveying mechanism 15 (step ST12), and the writing-completed media 11B is set in the media drive 13 to perform additional writing of data (step ST13). Thereafter, in the storage unit 17, a name of the additionally written data and the like are stored in the storage location corresponding to the writing-completed media 11B (step ST14). In addition, the writing-completed media 11B on which additional writing has been completed is taken out from the media drive 13 and is then returned to the original storage location in the writing-completed to media storage unit 19 (step ST15).

On the other hand, when the additionally written data is final additional data, the location where the writing-completed media 11B on which writing is to be performed is placed is checked on the basis of the attribute information of the additionally written data, the writing-completed media 11B on which writing is to be performed is taken out from the writing-completed media storage unit 19 by the media conveying mechanism 15 (step ST21), and the writing-completed media 11B is set in the media drive 13 to perform additional data writing (step ST22). Thereafter, finalizing processing on the writing-completed media 11B, on which the additional writing has been completed, is performed by the media drive 13 (step ST23). Then, in the storage unit 17, a name of the additionally written data and the like are stored in the storage location corresponding to the writing-completed media 11B (step ST24).

Thereafter, the writing-completed media 11B on which the additional writing has been completed is taken out from the media drive 13 and is then set in the label printer 14 to collectively print a name of the data, which is written in the media and stored in the storage unit 17, on the label surface 11a (step ST25). The writing-completed media 11B after the label has been collectively printed is returned to the original storage location in the writing-completed media storage unit 19 (step ST26).

Next, when a data reference command or a data output command is received (step ST31), a storage location of the writing-completed media 11B in which target data is written is specified on the basis of information stored in the storage unit 17, the writing-completed media 11B that is targeted is taken out from the writing-completed media storage unit 19 and is set in the media drive 13 by the media conveying mechanism 15 (step ST), and the target data is read out (step ST33). After the data reference or output is completed, reference or output history is stored in the storage unit 17 (step ST34), and the writing-completed media 11B is returned to the original storage location (step ST35).

On the other hand, when a media ejection command is received (step ST41), the storage location of the writing-completed media 11B to be taken out is specified on the basis of information stored in the storage unit 17, and it is determined whether the writing-completed media 11B is the writing-completed media 11B in which writing of final additional data is completed or the writing-completed media 11B other than that described above. In other words, it is determined whether or not the label printing is completed (step ST42).

In the event of the writing-completed media 11B where label printing is completed, the writing-completed media 11B that is targeted is taken out from the writing-completed media storage unit 19 by the media conveying mechanism 15 and is then set in the media drive 13, and finalizing processing on the writing-completed media 11B is performed such that additional writing of data is not possible (step ST43). Thereafter, the writing-completed media 11B is conveyed to the media outlet 20 so as to be able to be taken out (step ST44). In the storage unit 17, an indication that the writing-completed media 11B has been discharged is stored.

In the event of the media 11B on which label printing is not performed, the media is set in the printer 14 by the media conveying mechanism 15, thereby collectively performing the label printing (step ST45). Then, the media 11B on which printing has been completed is set in the media drive 13 and finalizing processing on the writing-completed media 11B in which writing has been completed is performed such that additional data writing is not possible (step ST43). Thereafter, the writing-completed media 11B is conveyed to the media outlet 20 so as to be able to be taken out (step ST44). In the storage unit 17, an indication that the writing-completed media 11B has been discharged is stored.

Furthermore, in an operation of taking out the writing-completed media 11B from the writing-completed media storage unit 19, when the writing-completed media 11B to be taken out is not positioned at the top, media stacked on the writing-completed media 11B to be taken out are taken out and then temporarily moved to the blank media supply unit 18 as described above. After taking out the writing-completed media 11B to be taken out and completing an operation, such as writing, on the corresponding media and returning the corresponding media, the media that were moved are returned to the writing-completed media storage unit 19.

As described above, in the CD publisher 5 in this example, it is possible to perform writing of data into each media 11 and additional writing into each media 11. In addition, it is also possible to refer to or output data of the writing-completed media 11B. Moreover, after final additional writing of data is performed or when the writing-completed media 11B is taken out, a label, such as a title, of the data written until then is collectively printed on the label surface 11a.

Figure 4:
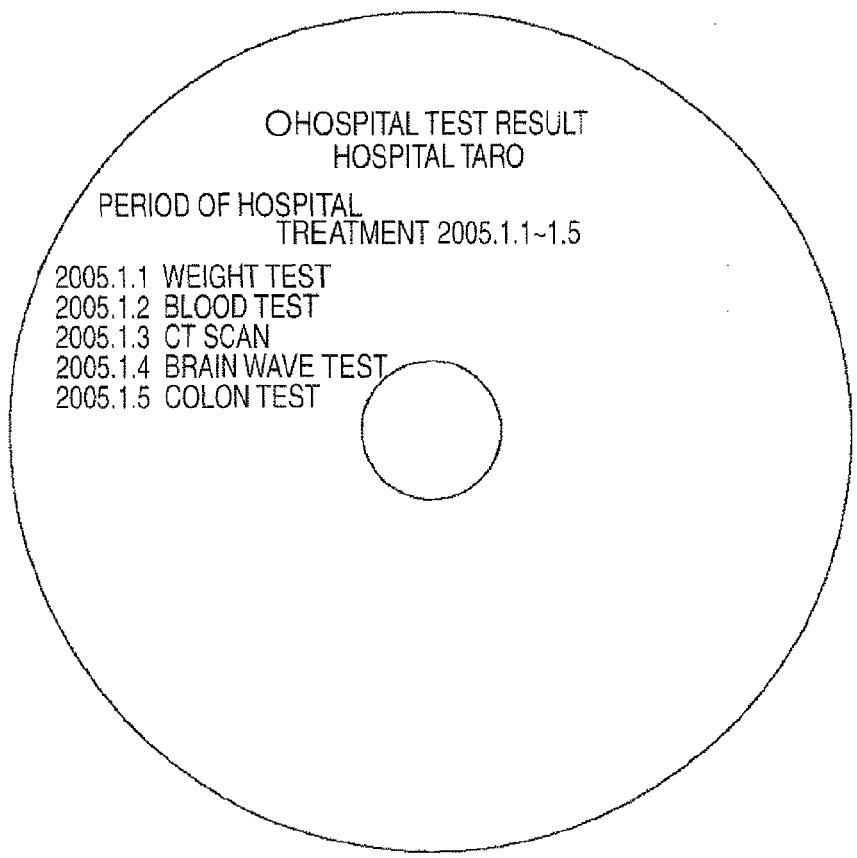
FIG. 4 is an explanatory view illustrating examples of written data and label printing.

For example, in the case of applying the CD publisher 5 in this example to the client management system in a hospital, it is possible to manage a patient by writing data in a sheet of media 11 within the CD publisher 5 every day, for example, when the patient has undergone a test for several days. For example, as shown in FIG. 4A, when a test is conducted for five days, the fifth day is a final day of the test, and a final test result is written, test items for the first to fifth days are printed on the label surface 11*a* of the writing-completed media 11B in a collective manner after the test result on the final fifth day is written. A printing example in this case is shown in FIG. 4B. Thus, by using the CD publisher 5 in this example, it is possible to manage every patient's data using a sheet of media 11 for every patient.

Further, in the CD publisher 5 in this example, the label printing is collectively performed after final data is written or when media are taken out. Accordingly, a sensor for checking the printing position such that a label does not overlap a label that was previously printed or an operation control, such as rotating of media, for the checking is not needed. As a result, it is possible to perform label printing with an easy and inexpensive configuration. Moreover, even in the case described above, the media 11 are built in the CD publisher 5 before a label is printed. Accordingly, any inconvenience is avoided.

Furthermore, in this example, the media 11B after data writing are conveyed to the label printer 14 at the time of first data writing, and a media ID is printed on the media label surface 1 la in the label printer 14. Thus, it is preferable to print a media ID on the media 11B written with data since an operation of checking each media 11B can be easily performed by visual observation, for example, in the event that the CD publisher 5 is out of order or if the media 11 are taken out for maintenance.

In addition, in this example, identification information, storage location information, information on written data, and information on additionally written data of the writing-completed media 11B, which is placed in the media storage unit 12 and in which data is written, are stored in the internal storage unit 17. As a place where such information is stored, a database of the server 4 (the same place as CD publication history information within the server is also possible) or an HAD of the client PC 3 may be used instead of the storage unit 17 inside the CD publisher 5. In addition, the information described above may be stored in a storage unit of a host PC connected to the CD publisher 5. It is needless to say that the same storage information be stored in a plurality of storage places.

(Example of a Specific Configuration of a CD Publisher)

Hereinafter, an example of the specific configuration of the CD publisher 5 will be explained with reference to FIGS. 5 to 11.

Figure 5:
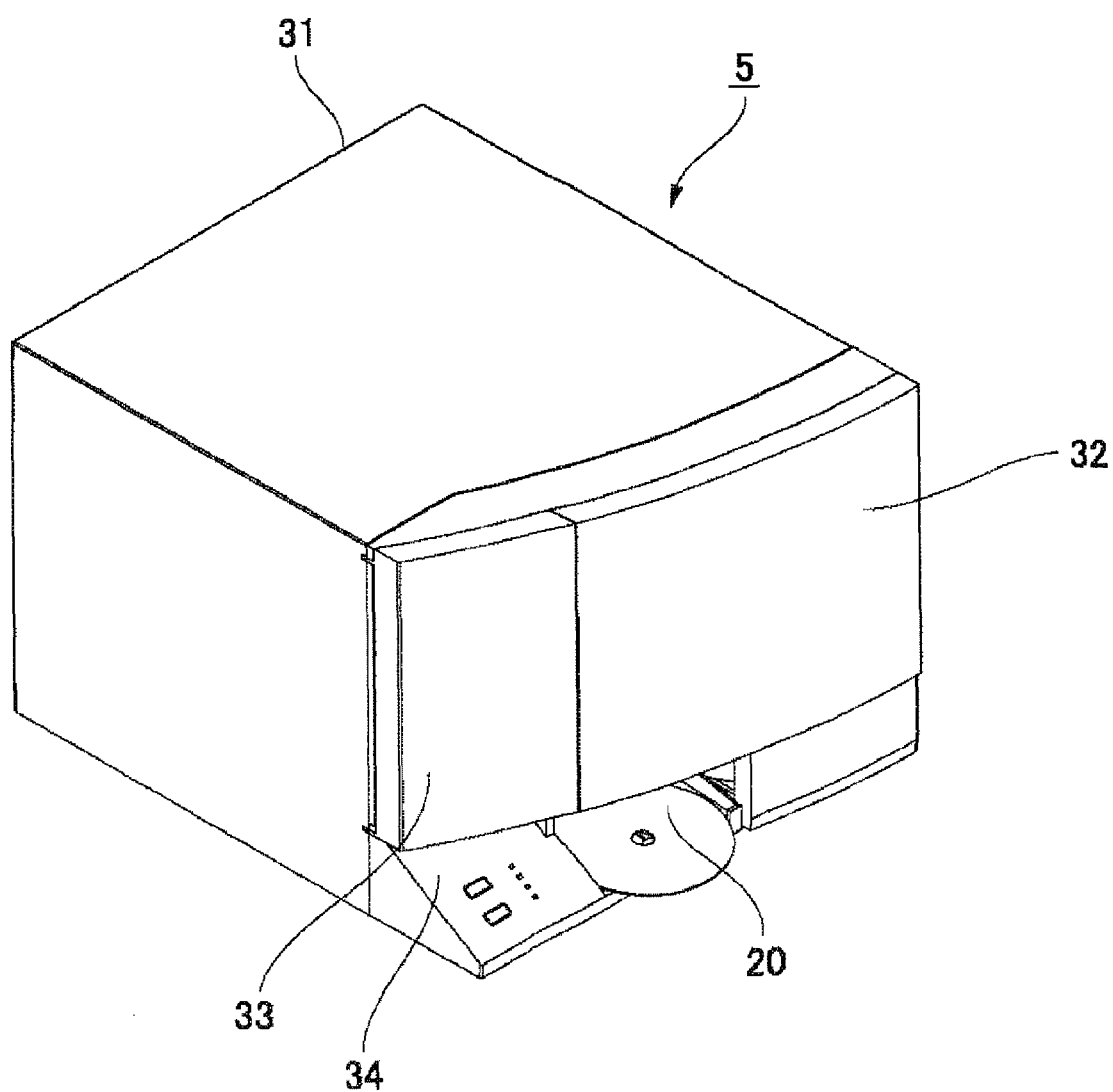
FIG. 5 is a perspective view of the outer appearance illustrating a specific example of the CD publisher shown in FIG. 1.

FIG. 5 is a perspective view illustrating the outer appearance of the CD publisher 5. The CD publisher 5 includes a housing 31 having approximately a rectangular parallelepiped shape, and doors 32 and 33 that can be opened and closed left and right are provided on a front face of the housing 31. An operation surface 34 on which a display lamp, an operation button, and the like are arranged is formed on a lower right end part of the doors 32 and 33, and the media outlet 20 is open in the vicinity of the operation surface 34.

Figure 6:
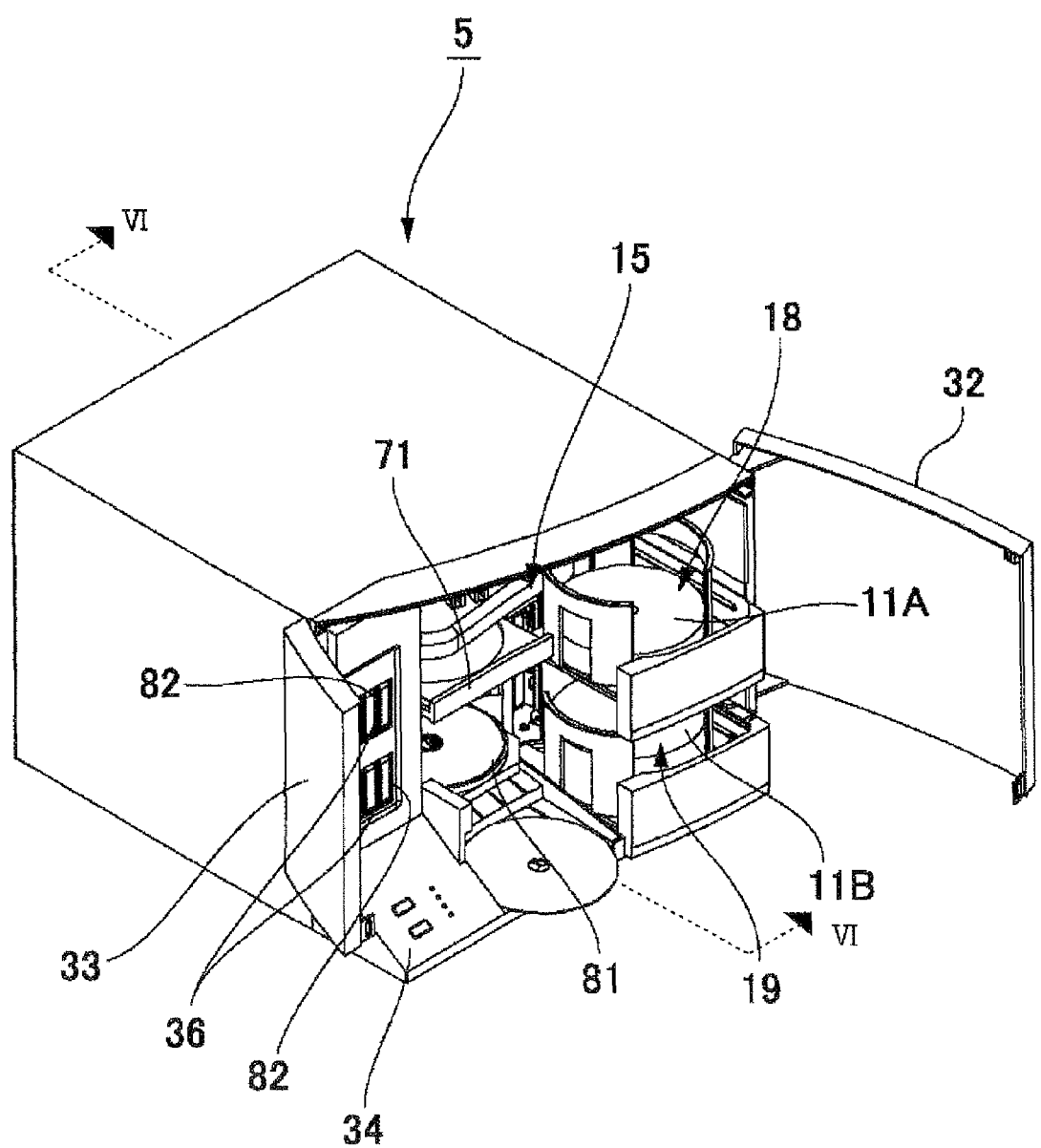
FIG. 6 is a perspective view illustrating a state in which doors are opened in the CD publisher shown in FIG. 5.

FIG. 6 is a perspective view illustrating the CD publisher 5 with the doors 32 and 33 opened. The left door 32 can be locked closed, and an individual authentication means, for example, a fingerprint sensor is provided on the operation surface 34 so that the left door 32 can be opened and closed by only a person registered in advance. In addition, the left door 32 may be opened and closed by a command from the management server 4. In contrast, the right door 33 is opened and closed at the time of replacement of an ink cartridge of the label printer 14, and a cartridge mounting part 36 is exposed if the door 33 is opened. In this example, the cartridge mounting part 36 having two upper and lower stages is formed.

Figure 7:
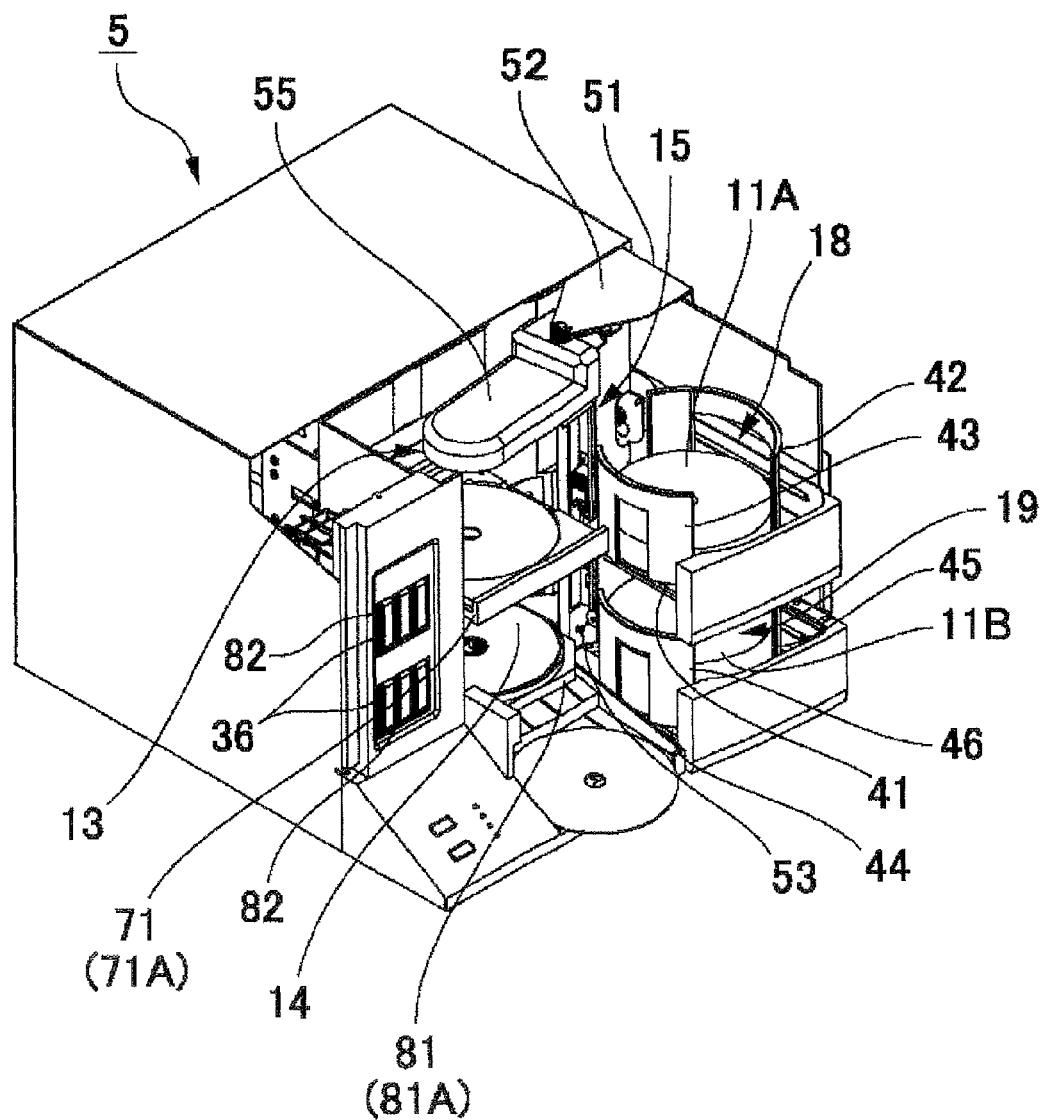
FIG. 7 is a perspective view illustrating the inner structure of the CD publisher shown in FIG. 5.
Figure 8:
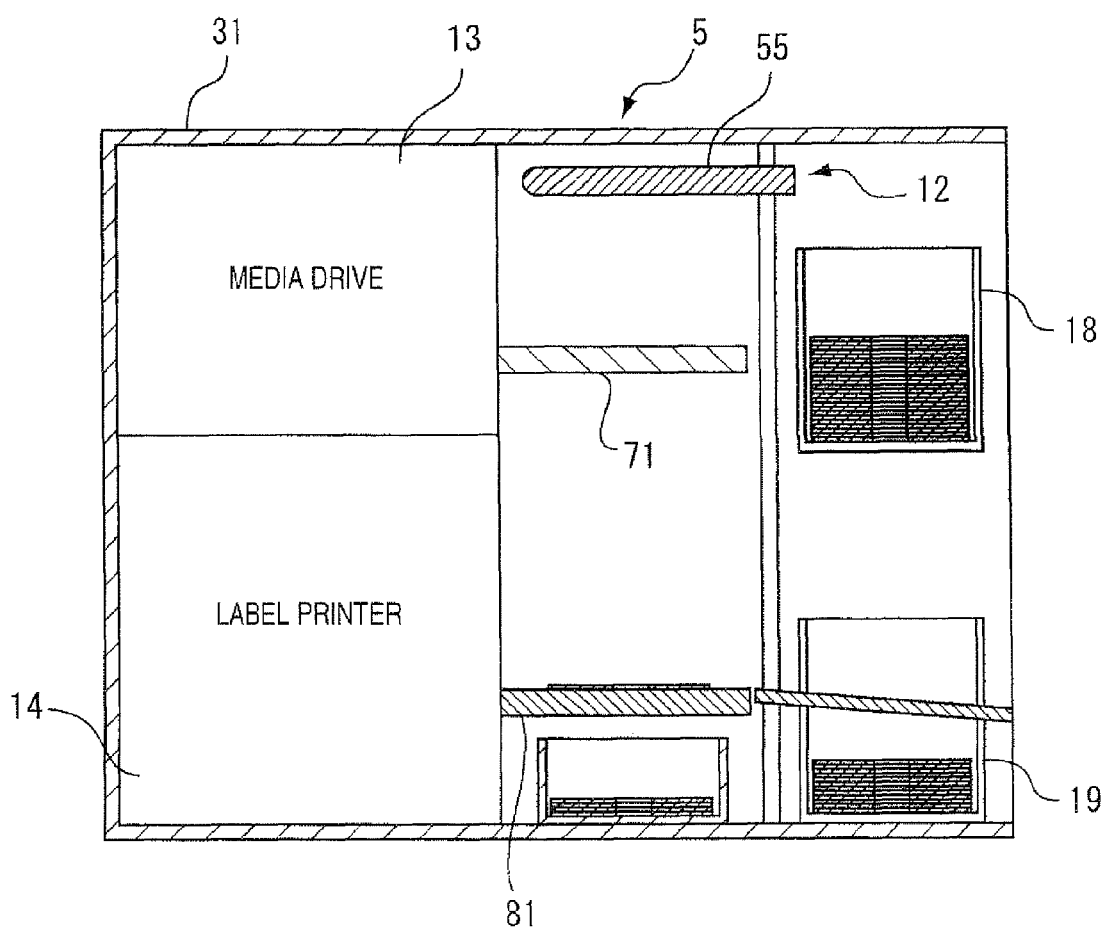
FIG. 8 is a cross-sectional view schematically illustrating the CD publisher taken along the line VI-VI of FIG. 6.

FIG. 7 is a perspective view illustrating the CD publisher 5 with a part of the housing 31 and the doors 32 and 33 removed, and FIG. 8 is a cross-sectional view schematically illustrating the CD publisher 5 taken along the line VI-VI of FIG. 6. An explanation will now be made with reference to FIGS. 6 and 8. In a left part inside the housing 31 of the CD publisher 5, the blank media supply unit 18 and the writing-completed media storage unit 19 are disposed above and below each other in a coaxial state. The blank media supply unit 18 includes a slide plate 41, which can be horizontally pulled out, and a pair of left and right casing boards 42 and 43 that are vertically disposed on the slide plate 41 and have a circular arc shape. Thus, a stacker is formed in which the media 11 can be placed from above and the media 11 can be stacked in a coaxial state. An operation of placing the media 11 in the blank media supply unit 18 or filling up the blank media supply unit 18 with the media 11 may be simply performed by opening the opening and closing door 32 and pulling out the slide plate 41 to the front.

The lower writing-completed media storage unit 19 has the same structure as described above. That is, the writing-completed media storage unit 19 includes a slide plate 44, which can be horizontally pulled out, and a pair of left and right casing boards 45 and 46 that are vertically disposed on the slide plate 44 and have a circular arc shape. Thus, a stacker is formed in which CDs can be placed from above and the CDs can be stacked in a coaxial state.

The media conveying mechanism 15 is disposed behind the blank media supply unit 18 and the writing-completed media storage unit 19. The media conveying mechanism 15 includes: a chassis 51 vertically provided on the housing 31; a vertical guide shaft 54 that is vertically provided between upper and lower horizontal supporting plate portions 52 and 53 of the chassis 51; and a media carrier 55 provided on the vertical guide shaft 54. The media carrier 55 can move up and down along the vertical guide shaft 54 and rotate left and right around the vertical guide shaft 54.

Beside the blank media supply unit 18, the writing-completed media storage unit 19, and the media conveying mechanism 15, the media drive 13 is disposed at an upper side, and the label printer 14 is disposed at a lower side. In FIGS. 6 and 7, a media tray 71 of the upper media drive 13 is shown pulled out to be at a media transfer position 71A, and a media tray 81 of the lower label printer 14 is shown at a media transfer position 81A on the front side. Moreover, the label printer 14 is an ink jet printer, and ink cartridges 82 corresponding to respective colors are used as an ink supply source. These ink cartridges 82 are mounted in the cartridge mounting part 36 from the front side.

Here, between the pair of left and right casing boards 42 and 43 of the blank media supply unit 18 and between the pair of left and right casing boards 45 and 46 of the writing-completed media storage unit 19, a gap is formed that allows the media carrier 55 of the media conveying mechanism 15 to move up and down. Furthermore, between the upper blank media supply unit 18 and the lower writing-completed media storage unit 19, a gap is formed such that the media carrier 55 can rotate horizontally to be positioned right above the upper blank media supply unit 18 and the lower writing-completed media storage unit 19. In addition, the media carrier 55 of the media conveying mechanism 15 can move downward so as to access the media tray 81 existing at the media transfer position if the upper media tray 71 is pushed into the media drive 13. Accordingly, it is possible to convey the media 11 to each portion through an operation based on a combination of rising and falling and leftward and rightward rotation of the media carrier 55.

Figure 9:
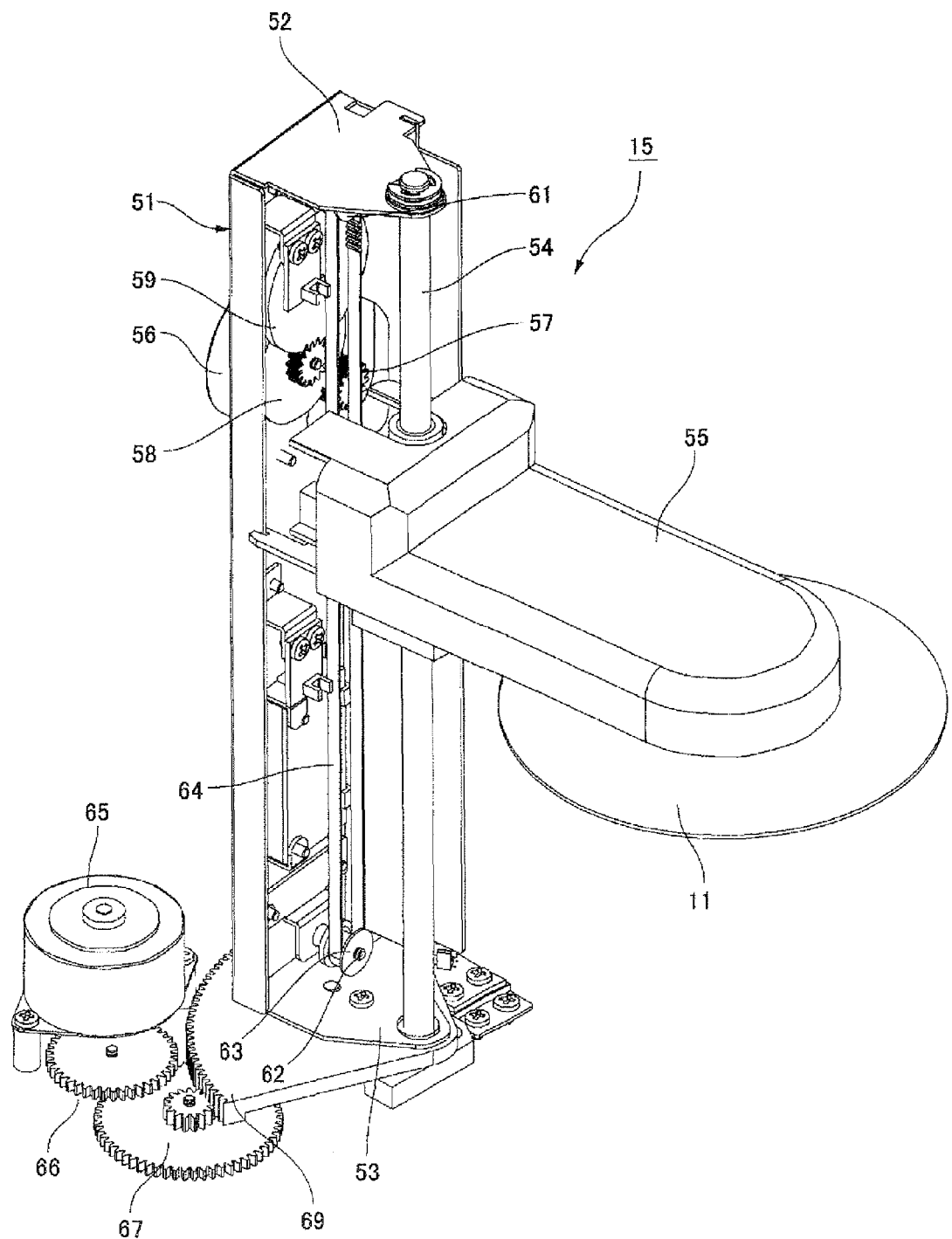
FIG. 9 is a perspective view illustrating a media conveying mechanism of the CD publisher shown in FIG. 5.

FIG. 9 is a perspective view illustrating only the media conveying mechanism 15. As described earlier, the media conveying mechanism 15 includes the chassis 51 vertically provided on the housing 31. The vertical guide shaft 54 is provided between the upper and lower horizontal supporting plate portions 52 and 53 of the chassis 51. The media carrier 55 is supported on the vertical guide shaft 54 so as to be able to move up and down and to rotate.

An up-and-down mechanism of the media carrier 55 has a motor 56 serving as a driving source. Rotation of the motor 56 is transmitted to a driving-side pulley 61 through a speed reduction gear train including a compound transmission gear 58, a transmission gear 59, and a pinion 57 provided on a motor output shaft. The driving-side pulley 61 is supported so as to be free to rotate around a horizontal rotation shaft (not shown) in the position near an upper end of the chassis 51. In the position near a lower end of the chassis 51, a driven-side pulley 63 is supported so as to be rotatable around a rotation shaft 62, which is also horizontal in the same manner as the above rotation shaft. A timing belt 64 is stretched between the driving-side pulley 61 and the driven-side pulley 63. A rear end portion of the media carrier 55 is fixed to one of left and right parts of the timing belt 64. Accordingly, when the motor 56 is driven, the timing belt 64 moves in the up and down directions, and the media carrier 55 attached to the timing belt 64 moves up and down along the vertical guide shaft 54.

A rotary mechanism of the media carrier 55 has a motor 65 serving as a driving source, and a pinion (not shown) is provided on an output shaft of the motor 65. Rotation of the pinion is transmitted to a fan shaped final-stage gear 69 through a speed reduction gear train including two compound transmission gears 66 and 67. The fan shaped final-stage gear 69 may rotate left and right around the vertical guide shaft 54. In addition, the chassis 51 on which constituent components of the up-and-down mechanism of the media carrier 55 are assembled is mounted on the fan shaped final-stage gear 69. When the motor 65 is driven, the fan shaped final-stage gear 69 rotates left and right, and accordingly, the chassis 51 mounted on the fan shaped final-stage gear 69 rotates left and right around the vertical guide shaft 54 as one body with the fan shaped final-stage gear 69. As a result, the media carrier 55 held by the up-and-down mechanism mounted on the chassis 51 rotates left and right around the vertical guide shaft 54.

In addition, the media carrier 55 includes, for example, three holding pawls at the center of a front-end portion, and one of the three holding pawls can move in the radial direction. The media 11 can be held by inserting the holding pawls in a center hole of the media 11 and moving one of the holding pawls outward in the radial direction. By moving one of the holding pawls inward in the radial direction in the holding state, the media 11 can be released to fall down from the holding pawls. Such holding mechanism is mounted on the media carrier 55. Such holding mechanism is the same as a holding mechanism provided in the media tray 81 of the printer 14 to be described later.

Figure 10:
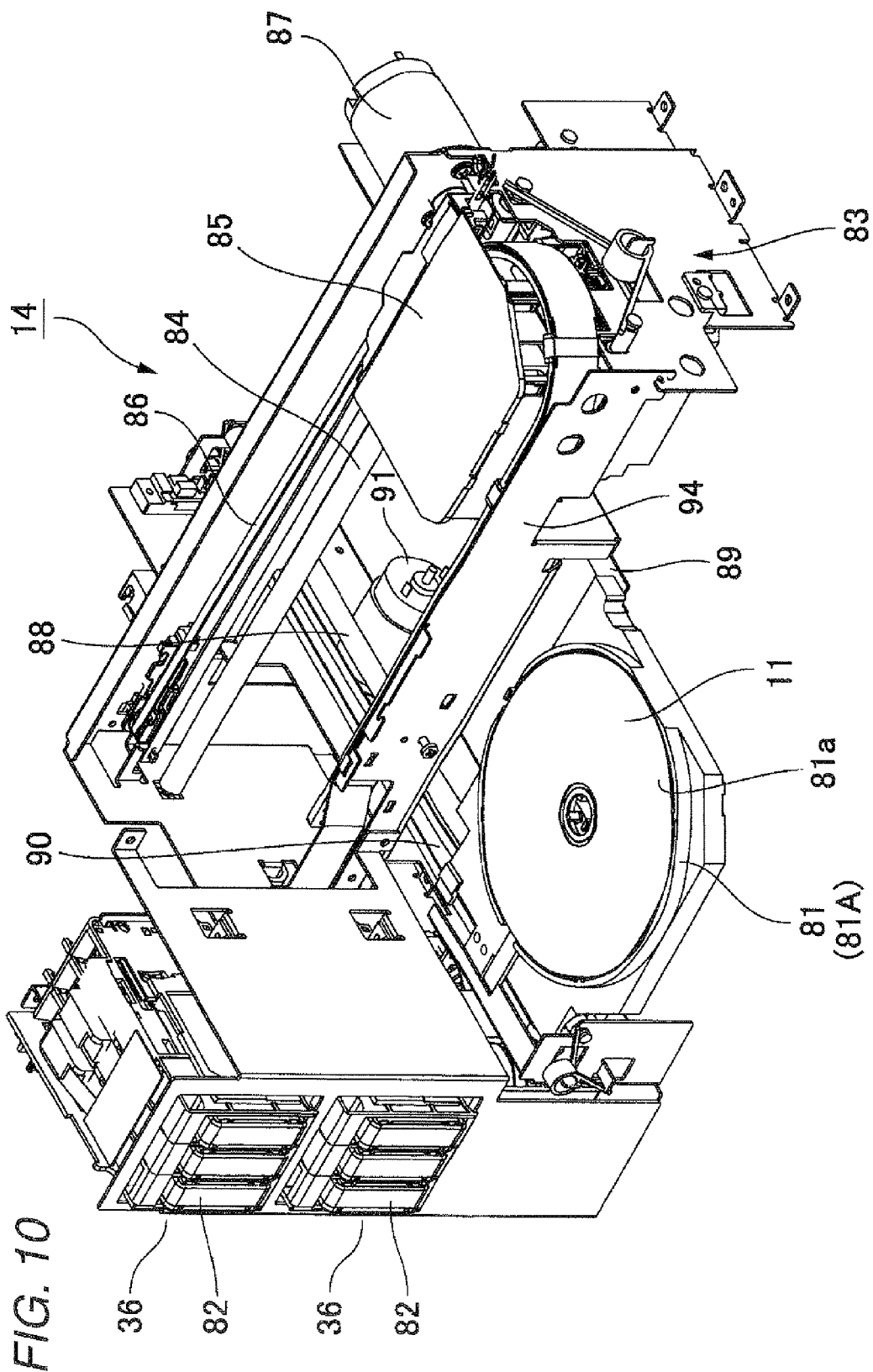
FIG. 10 is a perspective view illustrating a label printer of the CD publisher shown in FIG. 5.

FIG. 10 is a perspective view illustrating only the label printer 14, and FIG. 11 is a plan view illustrating the media tray 81. The label printer 14 includes a chassis 83, and a carriage guide shaft 84 is provided horizontally between left and right side plates located on a rear side of the chassis 83. A head carriage 85 on which an ink jet head (not shown) is mounted can reciprocate in the left and right directions along the carriage guide shaft 84. A carriage driving mechanism is configured to include a timing belt 86 that is provided horizontally in the left and right directions and a carriage motor 87 for driving the timing belt 86.

A nozzle surface of the ink jet head mounted on the head carriage 85 faces downward, and the media tray 81 can reciprocate horizontally in the front and rear directions below the ink jet head. A right end of the media tray 81 is supported by a guide shaft 88 that extends horizontally in the front and rear directions, and a left end of the media tray 81 is slidably supported by a guide rail 89 that extends horizontally in the front and rear directions. A driving mechanism of the media tray 81 is also configured to include a timing belt 90 that is provided horizontally in the front and rear direction and a tray motor 91 for driving the timing belt 90.

As shown in FIG. 11, the media tray 81 includes a circular shallow recess 81a, which is used to mount a CD thereon, on an upper surface of a rectangular plate. In addition, in a central portion of the recess 81a, three vertical pawls 92 to 94 that are arranged at a gap of 120° therebetween on the same circle are provided. The two vertical pawls 92 and 93 can move in the radial direction as one body, and the remaining vertical pawl 94 is disposed at a fixed position. The two vertical pawls 92 and 93 move by a driving mechanism such as an electromagnetic solenoid (not shown).

If the media 11 is placed on the recess 81a from above with a printing surface, such as a label, facing upward, the three vertical pawls 92 to 94 are inserted in a center hole of the media 11. Thereafter, if the vertical pawls 92 and 93 slightly move outward in the radial direction, the three vertical pawls 92 to 94 are pressed against an inner peripheral surface of the center hole of the media 11 from the inner side. Thus, the media 11 is held on the media tray 81. In this state, the tray motor 91 is driven to move the media tray 81 backward along the guide shaft 88, thereby moving the media tray 81 up to a printing area of the ink jet head. Thereafter, predetermined printing can be performed on the printing surface of the media 11 by means of the ink jet head.

OTHER EMBODIMENTS

In addition, in the example described above, an optical disk, such as a CD and a DVD, and a magneto-optic disk have been used as external recording media. However, it is possible to use media based on other formats, such as a semiconductor memory and a magnetic recording medium. In addition, as for a media drive for writing and reading of an external recording medium, it is possible to use a media drive that performs writing and publication operations on external recording media based on a single type or use a media drive having a function of performing writing and publication operations on external recording media based on different types or formats.

The invention claimed is:

1. A media processor comprising:
  a media storage unit that stores media;
  a media drive that performs writing of data into the media and reading of data from the media;
  a media conveying mechanism that conveys the media;
  a label printer that performs printing of information on a label surface of the media; and
  a control unit that performs a driving control for the media drive, the media conveying mechanism and the label printer,
  wherein in response to a data writing request, the control unit executes a media writing control operation in which blank media is taken out from the media storage unit, data is written in the blank media, the media is returned to the media storage unit as writing-completed media, and identification information, storage location information, and information on the written data of the writing-completed media are stored in a predetermined storage place, wherein in response to a data reference request or a data output request, the control unit executes a data reading control operation in which the writing-completed media is specified with reference to storage information stored in the storage place, the writing-completed media is taken out from the media storage unit, the written data is read from the writing-completed media, and the writing-completed media is returned to the media storage unit, wherein in response to an additional data writing request, the control unit executes an additional data writing control operation in which the writing-completed media is specified with reference to the storage information stored in the storage place, the writing-completed media is taken out from the media storage unit, additional data is written in the writing-completed media, the writing-completed media is returned to the media storage unit, and information on additionally written data is stored in the storage place, and wherein when the additional data written in the writing-completed media is final data or in response to a media discharge request, the control unit causes the label printer to collectively print the information on the written data and the information on the additionally written data on the label surface of the writing-completed media.

2. The media processor according to claim 1, wherein the storage place is an internal storage unit provided in the media processor.

3. The media processor according to claim 1, wherein the control unit executes finalizing processing for prohibiting additional writing of data into the writing-completed media on the writing-completed media when the additional data written in the writing-completed media is final data.

4. The media processor according to claim 1, further comprising a media outlet for discharging the media outside of the media processor, wherein in response to the media discharge request, the control unit causes the media conveying mechanism to discharge the media on which the information on the written data and the information on the additionally written data is printed, from the media outlet.

5. The media processor according to claim 1, wherein the media storage unit includes:

a blank media supply unit for storing the blank media in a stacked manner; and a writing-completed media storage unit for storing the writing-completed media in a stacked manner, and wherein the media conveying mechanism is configured to sequentially take out the media from the top position of each of the blank media supply unit and the writing-completed media storage unit and sequentially place the media at the top position of each of the blank media supply unit and the writing-completed media storage unit.

6. The media processor according to claim 5, wherein when the writing-completed media to be taken out does not exist at the top position of the writing-completed media storage unit, the control unit causes the media conveying mechanism to temporarily move writing-completed media stacked on the writing-completed media storage unit to be taken out to the blank media supply unit to place the writing-completed media to be taken out at the top position of the writing-completed media storage unit, and causes the media conveying mechanism to take out the writing-completed media to be taken out.

7. A control method of a media processor including a media storage unit that stores media, a media drive that performs writing of data into the media and reading of data from the media, a media conveying mechanism that conveys the media, and a label printer that performs printing on a label surface of the media, the control method comprising:

executing a media writing control operation in response to a data writing request, wherein the media writing control operation includes:

taking out blank media from the media storage unit;

writing data in the blank media;

returning the media in which the data is written to the media storage unit as writing-completed media; and storing identification information, storage location information, and information on the written data of the writing-completed media in a predetermined storage place;

executing a data reading control operation in response to a data reference request or a data output request, wherein the data reading control operation includes:

specifying the writing-completed media with reference to storage information stored in the storage place;

taking out the writing-completed media from the media storage unit;

reading the written data from the writing-completed media; and returning the writing-completed media to the media storage unit; and executing an additional data writing control operation in response to an additional data writing request, wherein the additional data writing control operation includes:

specifying the writing-completed media with reference to the storage information stored in the storage place;

taking out the writing-completed media from the media storage unit;

writing additional data in the writing-completed media;

returning the writing-completed media to the media storage unit; and storing information on additionally written data in the storage place; and collectively printing the information on the written data and the information on the additionally written data on the label surface of the writing-completed media by the label printer when the additional data written in the writing-completed media is final data or in response to a media discharge request.

8. The control method of the media processor according to claim 7, further comprising discharging the media on which the information on the written data and the information on the additionally written data is printed, from a media outlet in response to the media discharge request.

9. The control method of the media processor according to claim 7, further comprising executing finalizing processing for prohibiting additional writing of data into the writing-completed media on the writing-completed media before the printing when the additional data written in the writing-completed media is final data.

10. The control method of the media processor according to claim 7, further comprising executing finalizing processing for prohibiting additional writing of data into the writing-completed media on the writing-completed media after the printing when the additional data written in the writing-completed media is final data.

11. The media processor according to claim 1, wherein when the additional data written in the writing-completed media is final data, the control unit causes the label printer to collectively print the information on the written data and the information on the additionally written data on the label surface of the writing-completed media.

12. The media processor according to claim 11,
wherein when the additional data is written in the writing-completed media, the control unit determines whether the additional data is final data on the basis of attribute information of the additional data, and
wherein when the additional data is determined to be final data, the control unit executes finalizing processing for prohibiting additional writing of data in the writing-completed media on the writing-completed media, and causes the label printer to collectively print the information on the written data and the information on the additionally written data on the label surface of the writing-completed media.

13. The control method of the media processor according to claim 7, wherein the collectively printing is performed when the additional data written in the writing-completed media is final data.

14. The control method of the media processor according to claim 13, further comprising:
determining whether the additional data is final data on the basis of attribute information of the additional data when the additional data is written in the writing-completed media, and
executing finalizing processing for prohibiting additional writing of data into the writing-completed media on the writing-completed media and then performing the collectively printing when the additional data is determined to be final data.

* * * * *